(12) United States Patent
Hu et al.

(10) Patent No.: US 9,497,087 B2
(45) Date of Patent: Nov. 15, 2016

(54) SCALABLE POLICY DEPLOYMENT ARCHITECTURE IN A COMMUNICATION NETWORK

(71) Applicant: AT&T Intellectual Property I, L.P., Atlanta, GA (US)

(72) Inventors: Qingmin Hu, Sammamish, WA (US); Douglas Eng, Sammamish, WA (US); Terry Figurelle, Redmond, WA (US); Jie McKnight, Medina, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 121 days.

(21) Appl. No.: 14/598,601

(22) Filed: Jan. 16, 2015

(65) Prior Publication Data
US 2015/0127803 A1    May 7, 2015

Related U.S. Application Data

(63) Continuation of application No. 13/011,808, filed on Jan. 21, 2011, now Pat. No. 8,966,057.

(51) Int. Cl.
| | |
|---|---|
| *H04L 12/24* | (2006.01) |
| *H04N 21/2662* | (2011.01) |
| *H04L 12/54* | (2013.01) |

(Continued)

(52) U.S. Cl.
CPC ............ *H04L 41/5077* (2013.01); *H04L 12/56* (2013.01); *H04L 41/5096* (2013.01); *H04L 45/14* (2013.01); *H04L 47/782* (2013.01); *H04L 67/14* (2013.01); *H04L 67/142* (2013.01); *H04L 67/22* (2013.01); *H04L 67/306* (2013.01); *H04N 21/2662* (2013.01); *H04N 21/462* (2013.01); *H04W 28/14* (2013.01); *G06F 15/173* (2013.01); *H04L 43/12* (2013.01); *H04W 12/08* (2013.01)

(58) Field of Classification Search
CPC .................................................... H04L 41/5077
USPC ......................................................... 709/223
See application file for complete search history.

(56) References Cited

U.S. PATENT DOCUMENTS

| | | | |
|---|---|---|---|
| 6,052,371 A * | 4/2000 | Lemieux | H04Q 3/0062 370/328 |
| 6,088,688 A | 7/2000 | Crooks et al. | |

(Continued)

FOREIGN PATENT DOCUMENTS

WO      02052869 A3    12/2002

OTHER PUBLICATIONS

Kosiur, "Understanding Policy-based Networking", 2001.*

(Continued)

*Primary Examiner* — Ondrej C. Vostal
(74) *Attorney, Agent, or Firm* — Amin, Turocy & Watson, LLP

(57) ABSTRACT

Aspects describe using a Policy Access Gateway that can facilitate scalability within a communication network and that can provide a solution to deploy an enhanced policy gateway. The Policy Access Gateway can enhance standard defined Diameter Routing Agent (DRA) functions with session binding mechanisms. Further, the Policy Access Gateway is scalable and can be deployed in a very large network that supports hundreds of millions of users. Further, the Policy Access Gateway can provide additional policy information to enable policy information consolidation and caching capabilities.

20 Claims, 12 Drawing Sheets

(51) Int. Cl.
*H04N 21/462* (2011.01)
*H04L 12/911* (2013.01)
*H04W 28/14* (2009.01)
*H04L 29/08* (2006.01)
*H04L 12/721* (2013.01)
*G06F 15/173* (2006.01)
*H04L 12/26* (2006.01)
*H04W 12/08* (2009.01)

(56) References Cited

U.S. PATENT DOCUMENTS

| | | | |
|---|---|---|---|
| 6,564,209 B1 | 5/2003 | Dempski et al. | |
| 6,807,156 B1 | 10/2004 | Veres et al. | |
| 7,289,453 B2 | 10/2007 | Riedel et al. | |
| 7,289,964 B1 | 10/2007 | Bowman-Amuah | |
| 7,467,227 B1* | 12/2008 | Nguyen | H04L 12/2856 709/238 |
| 7,573,826 B1 | 8/2009 | Beshai et al. | |
| 7,577,736 B1 | 8/2009 | Ovenden | |
| 7,578,149 B2* | 8/2009 | Schmid | D06F 37/304 310/10 |
| 7,644,151 B2 | 1/2010 | Jerrim et al. | |
| 7,827,256 B2* | 11/2010 | Phillips | G06F 8/67 709/220 |
| 7,885,190 B1 | 2/2011 | Roesch et al. | |
| 8,160,063 B2 | 4/2012 | Maltz et al. | |
| 8,235,818 B2 | 8/2012 | Bortnik et al. | |
| 8,331,369 B2 | 12/2012 | Ee et al. | |
| 8,364,833 B2 | 1/2013 | Bennett et al. | |
| 8,452,866 B2* | 5/2013 | De Boer | 709/224 |
| 8,606,911 B2* | 12/2013 | Raleigh | H04L 12/14 707/694 |
| 8,607,300 B2* | 12/2013 | Wang | H04L 63/20 726/1 |
| 2002/0049841 A1 | 4/2002 | Johnson et al. | |
| 2002/0198748 A1 | 12/2002 | Eden et al. | |
| 2003/0065534 A1* | 4/2003 | McCartney | G06F 19/327 705/2 |
| 2004/0111379 A1 | 6/2004 | Hicks et al. | |
| 2006/0045098 A1* | 3/2006 | Krause | H04L 69/162 370/396 |
| 2006/0106941 A1 | 5/2006 | Singhal et al. | |
| 2006/0242685 A1* | 10/2006 | Heard | G06F 21/577 726/3 |
| 2006/0268905 A1* | 11/2006 | Su | H04L 45/302 370/401 |
| 2006/0280186 A1* | 12/2006 | Carlton | H04L 41/0893 370/395.52 |
| 2007/0005801 A1 | 1/2007 | Kumar et al. | |
| 2007/0112578 A1* | 5/2007 | Randle | H04L 63/0272 713/156 |
| 2007/0156919 A1* | 7/2007 | Potti | G06F 8/67 709/238 |
| 2007/0180490 A1* | 8/2007 | Renzi | G06F 21/577 726/1 |
| 2008/0034080 A1* | 2/2008 | Chamaraj | H04L 12/14 709/223 |
| 2008/0065466 A1* | 3/2008 | Liu | G06F 8/10 705/348 |
| 2008/0147623 A1 | 6/2008 | Swaminathan et al. | |
| 2009/0016344 A1* | 1/2009 | Hu | H04L 47/41 370/389 |
| 2009/0097402 A1* | 4/2009 | Stumpert | H04L 47/10 370/230.1 |
| 2009/0113514 A1* | 4/2009 | Hu | H04L 65/1066 726/1 |
| 2009/0141625 A1 | 6/2009 | Ghai et al. | |
| 2009/0227231 A1 | 9/2009 | Hu et al. | |
| 2009/0228953 A1* | 9/2009 | Hu | G06F 15/17343 726/1 |
| 2009/0228954 A1 | 9/2009 | Hu et al. | |
| 2009/0305684 A1 | 12/2009 | Jones et al. | |
| 2010/0069035 A1 | 3/2010 | Johnson | |
| 2010/0091671 A1 | 4/2010 | Lidstrom et al. | |
| 2010/0095017 A1* | 4/2010 | Ghetie | H04L 47/10 709/232 |
| 2010/0135196 A1 | 6/2010 | Cheng et al. | |
| 2010/0157016 A1 | 6/2010 | Sylvain | |
| 2010/0284336 A1 | 11/2010 | Rui et al. | |
| 2010/0317420 A1 | 12/2010 | Hoffberg | |
| 2010/0319004 A1* | 12/2010 | Hudson | G06F 9/5072 719/313 |
| 2011/0047055 A1* | 2/2011 | Funk | G06Q 30/04 705/34 |
| 2011/0128907 A1 | 6/2011 | Kvernvik | |
| 2011/0138005 A1 | 6/2011 | Zhou et al. | |
| 2011/0138066 A1 | 6/2011 | Kopplin et al. | |
| 2011/0158090 A1* | 6/2011 | Riley | H04L 12/14 370/230 |
| 2011/0173334 A1 | 7/2011 | Shah | |
| 2011/0211464 A1* | 9/2011 | Chetlur | H04L 41/5067 370/252 |
| 2011/0219431 A1 | 9/2011 | Akhtar et al. | |
| 2011/0225424 A1 | 9/2011 | Zee et al. | |
| 2011/0252123 A1 | 10/2011 | Sridhar et al. | |
| 2011/0252438 A1 | 10/2011 | Tremblay et al. | |
| 2012/0163174 A1* | 6/2012 | Shukla | H04L 49/505 370/235 |
| 2012/0210003 A1 | 8/2012 | Castro et al. | |
| 2013/0067082 A1* | 3/2013 | Khan | H04L 12/413 709/225 |

OTHER PUBLICATIONS

Li et al., "Feeder transit services: Choosing between fixed and demand responsive policy", 2009.*
Lee et al., "Is Server Consolidation Beneficial to MMORPG ? A Case Study of World of Warcraft", 2010.*
Merriam-Webster, "consolidate", 2016.*
Merriam-Webster, "convergence", 2016.*
Wickremasinghe et al., "CloudAnalyst: A CloudSim-based Visual Modeller for Analysing Cloud Computing Environments and Applications", 2010.*
Hu, Centralized Policy Management Architecture for Mobile Network. Unpublished U.S. Appl. No. 11/533,302, filed Sep. 19, 2006, 42 pages.
International Search Report for PCT Patent Application No. US2012/021613 dated Jul. 10, 2012, 17 pages.
Office Action dated Oct. 17, 2012 for U.S. Appl. No. 13/011,808, 41 pages.
Ergen, Drivers of Convergence, Mobile Broadband: Including WiMAX and LTE, 2009, pp. 447-479, Springer, New York.
Korowajczuk, LTE, WiMAX and WLAN Network Design, Optimization and Performance Analysis. 2011, 57 pages, John Wiley &Sons, Ltd. Publication.
Calhoun, et al., Diameter Base Protocol, RFC 3588, 2003.
Falchuk, et al., Innovative Approach for Improving Access to Wireless Services in High Occupancy Vehicles, 2008, 8 pages.
Office Action dated Feb. 1, 2013 for U.S. Appl. No. 13/011,808, 51 pages.
Office Action dated Apr. 23, 2014 U.S. Appl. No. 13/011,808, 38 pages.
Notice of Allowance dated Oct. 16, 2014 for U.S. Appl. No. 13/011,808, 39 pages.

* cited by examiner

SCALABLE POLICY DEPLOYMENT ARCHITECTURE IN A COMMUNICATION NETWORK

CROSS-REFERENCE TO RELATED APPLICATIONS

This application is a continuation of, and claims priority to, U.S. patent application Ser. No. 13/011,808, entitled "A SCALABLE POLICY DEPLOYMENT ARCHITECTURE IN A COMMUNICATION NETWORK," and filed Jan. 21, 2011, the entirety of which application is hereby incorporated herein by reference.

TECHNICAL FIELD

The subject disclosure relates to wireless communications and, more particularly, to a scalable policy management and deployment architecture in a wireless communications network.

BACKGROUND

With the increasingly high demand for mobile broadband services, network operators are rushing to deploy large-scale networks. Such networks include Long Term Evolution (LTE) networks as well as other types of networks. The new services that will be supported on the networks are both data (particularly video) and voice. These services require Quality of Services (QoS) and some services (such as voice) will require guaranteed bit rate bearers to deliver good customer experience. In addition, operators need to differentiate, control, and bill different types of traffic on the network.

Traditionally, policy management for telecommunication networks has focused mainly on network management. In recent years, however, as wireless networks have migrated toward Internet Protocol (IP)-based service environments, policy management has been gaining increasing importance to telecommunication networks that manage and control those services. Thus, policy management becomes an important component in the deployment.

Although policy management has been standardized in some networks, such as LTE networks, the deployment use cases and architecture are not covered in the standard and it is up to each operator to decide how to deploy the network based on its services and use cases. Further, each separate service, or class of services, requests the networks to apply different policy mechanisms, depending on the type of request being handled. Additionally, most of the management functions are scattered across the network and tend to be performed in a localized and static fashion.

For instance, when a user of a networked portable device, such as a cell phone, Personal Digital Assistant (PDA), laptop, or the like, request(s) access to one or more services offered through the one more networks, there is no common manner to track access and user requests based on type of services, such as voice. Further, there is no common means to manage, store, update, and so forth, the policies.

In a large scale LTE deployment, to support voice and other services, it is important to track media sessions and provide end-to-end session tracking and management. Further, there is no common architecture that enables scaling of policy framework deployment in such networks.

The above-described deficiencies of today's policy deployment architectures are merely intended to provide an overview of some of the problems of conventional systems, and are not intended to be exhaustive. Other problems with conventional systems and corresponding benefits of the various non-limiting embodiments described herein may become further apparent upon review of the following description.

BRIEF DESCRIPTION OF THE DRAWINGS

Various non-limiting embodiments are further described with reference to the accompanying drawings in which.

DETAILED DESCRIPTION

Overview

Figure 1:
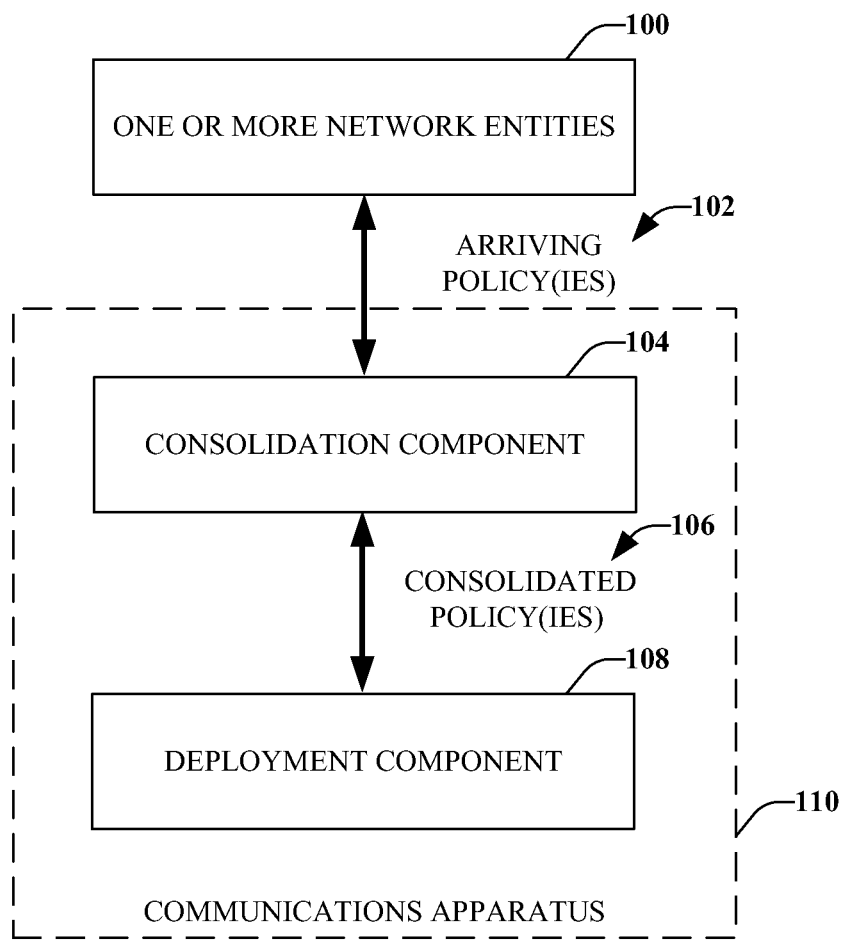
FIG. 1 illustrates a high-level block diagram of an exemplary communication system, according to an aspect.

Network deployment should support IP-based and non-IP based service traffic, including voice services and mobile data services. For example, there are challenges in deploying voice over Long Term Evolution (LTE) networks (as well as other networks) since such deployment can comprise Internet Protocol (IP) Multimedia Subsystem (IMS) systems in order to manage voice media. For some applications, the voice media stream should be Quality of Service (QoS) enabled and have a guaranteed bit rate. In addition, the media should be anchored outside of the LTE/EPC (Evolved Packet Core) network, such as with a session border controller (SBC). Thus, it would be desirable to provide network elements that can keep track of these media sessions and that can provide end to end session tracking and management.

In addition, the current policy framework deployment can be difficult to scale up in order to support projected user and traffic growth in the future. Additionally, there currently is no mechanism to manage the complexity of networks in terms of policy related services and information. Further, the current deployment is very difficult to scale up in terms of additional Policy and Charging Rules Function (PCRF) deployment.

Thus, it would be beneficial to provide a scalable and deployable solution that will address these problems. Further, it would be beneficial to provide a scalable and deployable solution that will support a communication network with the projected (as well as more than projected) user and traffic growth.

An aspect relates to a method that comprises providing routing between network entities and a plurality of service zones. The method also comprises receiving network policy information from the network entities. At least one network entity performs a first function that is different from a second function performed by a second network entity. The method can also comprise tracking user service activities and managing the plurality of service zones based on the network policy information, wherein the managing is performed on behalf of the network entities.

Various embodiments provide a solution to deploy an enhanced policy gateway. One or more disclosed aspects can enhance standard defined Diameter Routing Agent (DRA) functions with session binding mechanisms. Further, the disclosed embodiments are scalable and can be deployed in a very large network that supports hundreds of millions of users. Additionally, one or more embodiments can provide additional policy information to enable policy information consolidation and caching capabilities.

Further, one or more embodiments provide a single network entity that is configured to consolidate policy related functions and manage the network related policies. The single entity can perform the functions of a standard Diameter Routing Agent (DRA), as defined by the Third ($3^{rd}$) Generation Partnership (3GPP). In addition to the standard DRA functions, the single entity can also perform additional functions to process the policies. Further, the single entity can retain some state and session information, in accordance with one or more of the aspects disclosed herein. These and other embodiments are described in more detail below.

In an example, the method also comprises retaining at least one state and session information related to a service in a service zone of the plurality of service zones. In accordance with some aspects, the providing comprises providing routing between the network entities and five or more service zones.

According to an aspect, the method comprises managing the plurality of service zones, wherein a first service zone is located in a first national data center and a second service zone is located in a second national data center.

Additionally, the tracking can comprise tracking a first activity for a first user service session and a second activity for a second user service session. In accordance with some aspects, the tracking comprises tracking a plurality of services provided to one user device. In another aspect, the tracking comprises tracking different network elements that facilitate the user service activities. According to a further aspect, the tracking comprises tracking different combinations of network nodes that support the user service activities. Such tracking can be utilized to provide end-to-end session tracking and management (e.g., differentiate, control, and bill different types of services (or traffic) on the network.

The method can also comprise communicating with the plurality of service zones on behalf of one or more of the network entities and communicating with one or more of the network entities on behalf of the plurality of service zones.

Another aspect relates to an apparatus comprising a consolidation component that manages and consolidates network related policies. In accordance with some aspects, the network related policies are managed on behalf of a first entity and at least a second entity, wherein the first entity and the at least a second entity perform disparate functions. The apparatus also comprises a deployment component that implements the network related policies on a plurality of service zones.

In accordance with some aspects, the apparatus comprises an interface component that communicates with the plurality of service zones on behalf of the first entity and the second entity. According to another aspect, the apparatus comprises an interface component that communicates with the first entity and the second entity on behalf of the plurality of service zones. The plurality of service zones can comprise five or more service zones.

In accordance with some aspects, the apparatus comprises a mapping component that tracks user service activities and network nodes that support the user service activities. According to some aspects, the apparatus comprises a storage media that retains at least one state and session information related to a service in a service zone of the plurality of service zones.

A further aspect relates to computer-readable storage medium comprising computer-executable code instructions stored therein, wherein in response to execution by at least one processor. The computer-executable code instructions perform operations comprising tracking user service activities with respect to a wireless communication network and correlating the user service activities to different combinations of network nodes that support the user service activities.

In accordance with some aspects, the user service activities comprise a first activity for a first service session and a second activity for a second service session. In another aspect, the user service activities comprise a plurality of services provided to one user device. In a further aspect, the user service activities comprise different network elements that provide the user service activities.

According to some aspects, the operations further comprise providing routing between network entities and a plurality of service zones and receiving network policy information from the network entities that comprise different functions. The operations can also comprise managing the plurality of service zones based on the network policy information, wherein the managing is performed on behalf of the network entities.

Herein, an overview of some of the embodiments for a scalable policy deployment architecture has been presented above. As a roadmap for what follows next, various exemplary, non-limiting embodiments and features for policy deployment architectures are described in more detail. Then, some non-limiting implementations and examples are given for additional illustration, followed by representative networks and environments in which such embodiments and/or features can be implemented.

A Scalable Policy Deployment Architecture in a Communication Network

By way of further description with respect to one or more non-limiting ways to provide a scalable policy deployment architecture, a high-level block diagram of an exemplary communication system is illustrated generally by FIG. 1. The communication system can be included in an environment, which can be a communications network and/or a set of communication networks. Network types can include Universal Mobile Telecommunications Systems (UMTS), Long Term Evolution (LTE), High Speed Packet Access (HSPA), Code Division Multiple Access (CDMA), Multi-Carrier Code Division Multiple Access (MC-CDMA), Single-Carrier Code Division Multiple Access (SC-CDMA), Time Division Multiple Access (TDMA), Frequency Division Multiple Access (FDMA), Single-Carrier FDMA (SC- FDMA), Orthogonal Frequency Division Multiple Access (OFDMA), and so on. Although the various aspects and examples are discussed herein with respect to a LTE network, it should be appreciated that the disclosed aspects can be utilized with other networks and any references to LTE networks are for purposes of simplicity of describing the various aspects.

The environment can include a multitude of network entities 100, wherein each entity (or a set of entities) can perform a function that is different from a function performed by another entity (or another set of entities). Network entities, can include, but are not limited to, Diameter Routing Agents (DRAs), Balance Manager (BMs), Policy and Charging Enforcement Functions (PCEFs), Policy Controlling and Rules Functions (PCRF), Session Border Controllers (SBCs), gateways (e.g., messaging gateway), application and content providers, and so forth.

Further, the network entities 100 can deploy one or more policies. As used herein, "policies" refers to a set of one or more rules that a network operator can define and enforce in a telecommunications network (e.g., environment). The policies can be exchanged and can be applied both within an operator domain and across different operator domains. The policies are input in the form of one or more arriving policies 102 to a consolidation component 104. The consolidation component 104 is configured to manage the one or more arriving policies, wherein each of the arriving policies can be associated with a different network entity. Further, the consolidation component 104 is configured to consolidate the one or more arriving policies 102. At least a subset of the consolidated policy information 106 is conveyed to a deployment component 108 that is configured to implement the network related policies on a multitude of service zones included in the environment.

As shown, consolidation component 104 and deployment component 108 can be included in a communications apparatus 110 or network entity. In accordance with some aspects, the communications apparatus 110 (sometimes referred to herein as a Policy Access Gateway (PAG)) can be configured to perform various functions usually performed by a DRA. In accordance with some aspects, the communications apparatus 110 is configured to perform functions for processing policies. According to some aspects, the communications apparatus 110 is configured to perform both DRA functions as well as additional functions for policy processing. Further, the communications apparatus 110 can be configured to retain state and session information. Additionally, the communications apparatus 110 is configured to provide intelligent policy routing between PCEFs and their managing PCRF instance. Further, according to some aspects, the communications apparatus 110 is configured to provide policy and charging control for PCEFs that are located in a large number of service zones, wherein the service zones can be in the same or in different National Data Centers (NDC).

In an embodiment, the communication system illustrated by FIG. 1 can differ in operation from a conventional communication system in order to provide additional benefits over those achievable by systems that employ a non-scalable policy deployment architecture. For instance, the communication systems disclosed herein are scalable and can be deployed in a very large network that support hundreds of millions of users.

Figure 2:
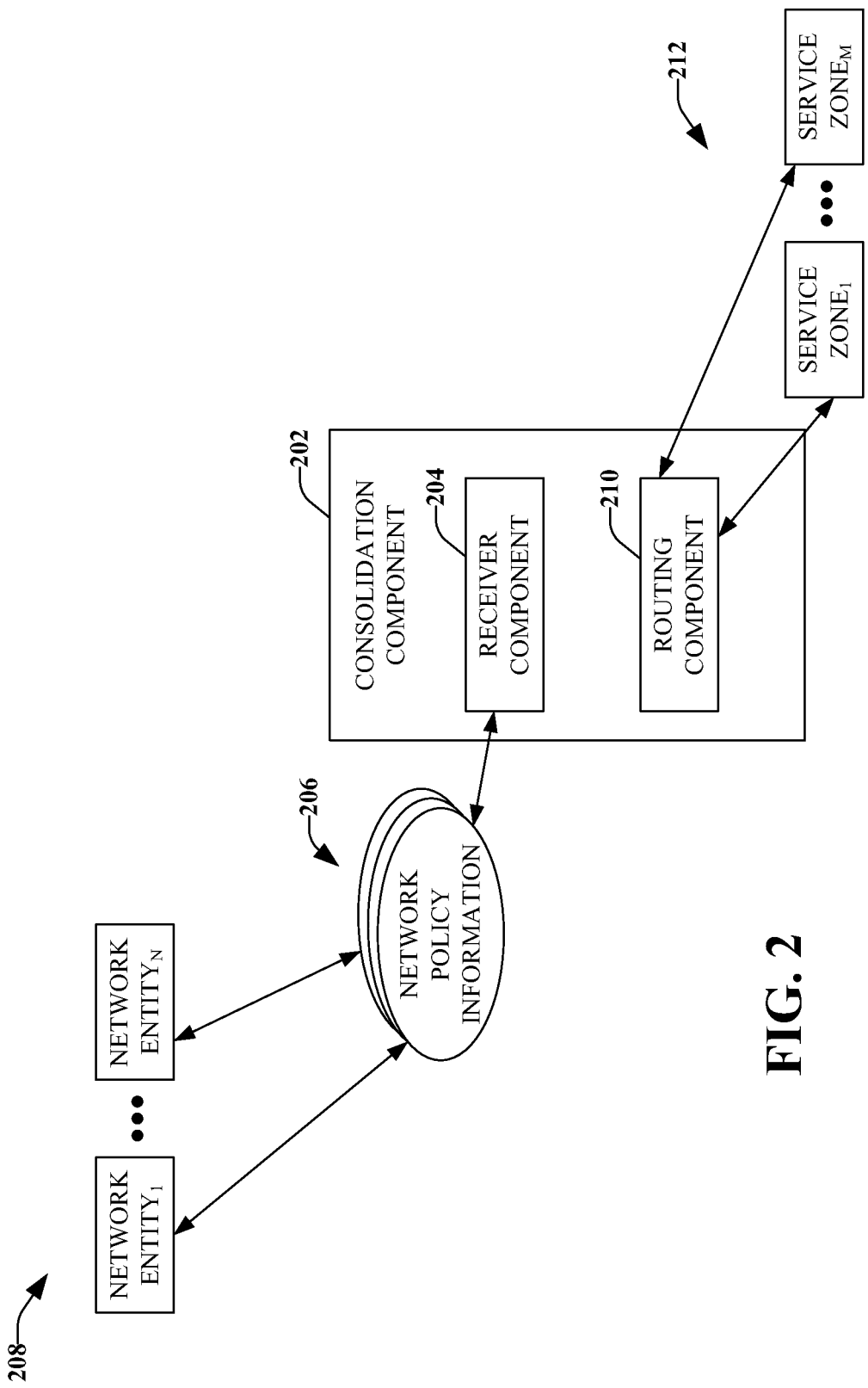
FIG. 2 is a block diagram showing a consolidation component, according to an aspect.

Illustrating other aspects, FIG. 2 is a block diagram showing a consolidation component 202, according to an aspect. The consolidation component 202 is configured to receive, manage, and consolidate network related policies.

As discussed with reference to FIG. 1, the consolidation component 202 can be included in a communication apparatus or PAG.

The consolidation component 202 comprises a receiver component 204 that is configured to obtain network policy information 206 from a multitude of network entities 208, labeled as network entity$_1$ through network entity$_N$, where N is an integer. Each of the network entities 208 can perform a different function, or subsets of the network entities can perform different functions, wherein a subset, as used herein, comprises one or more network entities. For example, a first subset of network entities can perform a first function, a second subset of network entities can perform a second function, a third subset of network entities can perform a third function, and so on.

For example, a network entity can be an Application Function (AF), which is an element offering applications that need dynamic policy and/or charging and control over an IP-Connectivity Access Network (IP-CAN) user plane behavior. The AF can receive an indication that the service information is not accepted by a PCRF together with service information that the PCRF would accept. In that case, the AF rejects the service establishment to the user equipment (or user device). If possible, the AF can forward to the user equipment an indication of the service information that the PCRF would accept. AF may communicate with multiple PCRFs and contact the appropriate PCRF based on either an end user IP Address and/or a user equipment identity of which the AF is made aware.

In a further example, another network entity is a Subscription Profile Repository (SRP) logical entity that includes all subscriber/subscription related information needed for subscription-based policies and IP-CAN (Internet Protocol Connectivity Access Network) bearer level charging rules by the PCRF. The SPR may be combined with or distributed across other databases in the operator's network. SPR may provide information including, but not limited to, Subscriber's allowed services, Information on subscriber's allowed QoS, Subscriber's charging related information, and Subscriber category.

Another example of a network entity and its related functionality is a PCEF, which examines packets passing though a gateway and enforces control and charging policy decisions on the packets. These policy decisions are generated by a policy decision engine, which can be called a Policy Control and Charging Rules Function (PCRF) in 3GPP. A Gx reference point carries subscriber information and access sessions information from the PCEF to the PCRF and policy decisions from the PCRF to the PCEF.

The consolidation component 202 also comprises a routing component 210 that is configured to provide routing between the network entities 208 and a multitude of service zones 212, labeled as service zone$_1$ though service zone$_M$, where M is an integer. In an example, the routing between the network entities 208 and the multitude of service zones 212 might have previously been performed by a Diameter Routing Agent (DRA), according to conventional deployment architectures. However, in accordance with the disclosed aspects, the routing is performed by the routing component 210 or another component of the communications apparatus (or PAG). In accordance with some aspects, service zones 212 comprise five or more service zones, wherein the routing component 210 further provides routing between the network entities 208 and the five or more service zones 212.

Figure 3:
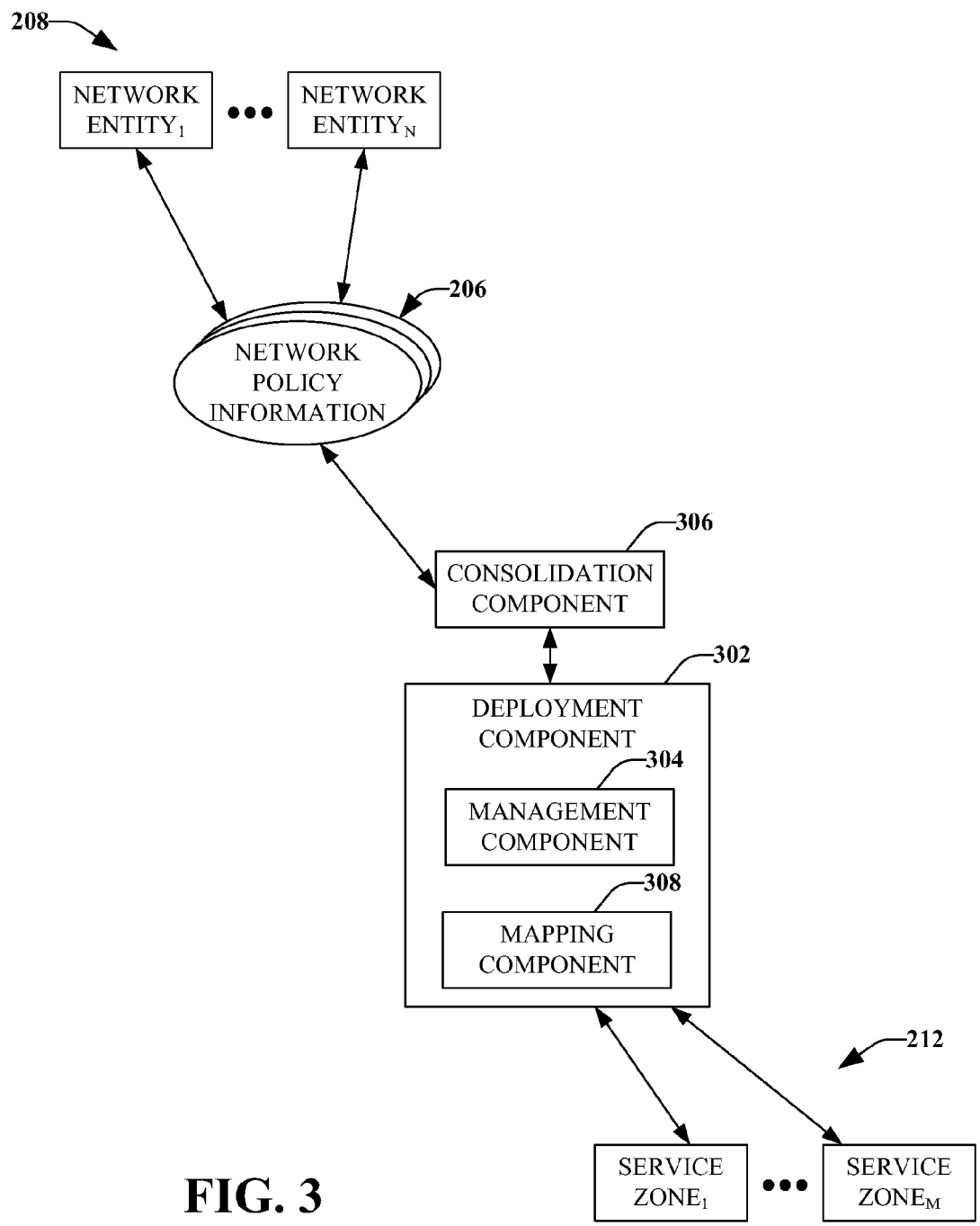
FIG. 3 is a block diagram showing a deployment component, according to an aspect.

Illustrating other aspects, FIG. 3 is a block diagram showing a deployment component 302, according to an aspect. The deployment component 302 is configured to implement the network related policies on a plurality of service zones. As discussed with reference to FIG. 1, the deployment component 302 can be included in a communication apparatus or PAG.

The deployment component 302 can comprise a management component 304 that is configured to manage the multitude of service zones 212 (labeled as service zone$_1$ though service zone$_M$, where M is an integer) based on the network policy information 206 (received by a consolidation component 306 and conveyed to deployment component 302).

In an aspect, the managing by management component 304 is performed on behalf of the different network entities 208. Thus, deployment component 302 can comprise a mapping component 308 that is configured to track the network policies (or consolidated network policies) and associate each policy or set of policies to each service zone. In accordance with some aspects, the mapping is performed at a device level, wherein each policy (or set of policies) is matched to a user equipment level. In accordance with some aspects, the mapping component 308 tracks user service activities and network nodes that support the user service activities. For example, the mapping component 308 can track a first activity for a first user service and a second activity for a second user service.

For example, mapping component 308 can be configured to track the user service activities based on the IP flows that carry the bits for these services. The requests can be received from user agents, which are applications on the user device or user equipment, for example. The user service activities can include, but are not limited to, a voice call, an instant message, an Internet browsing session, and so forth.

Figure 4:
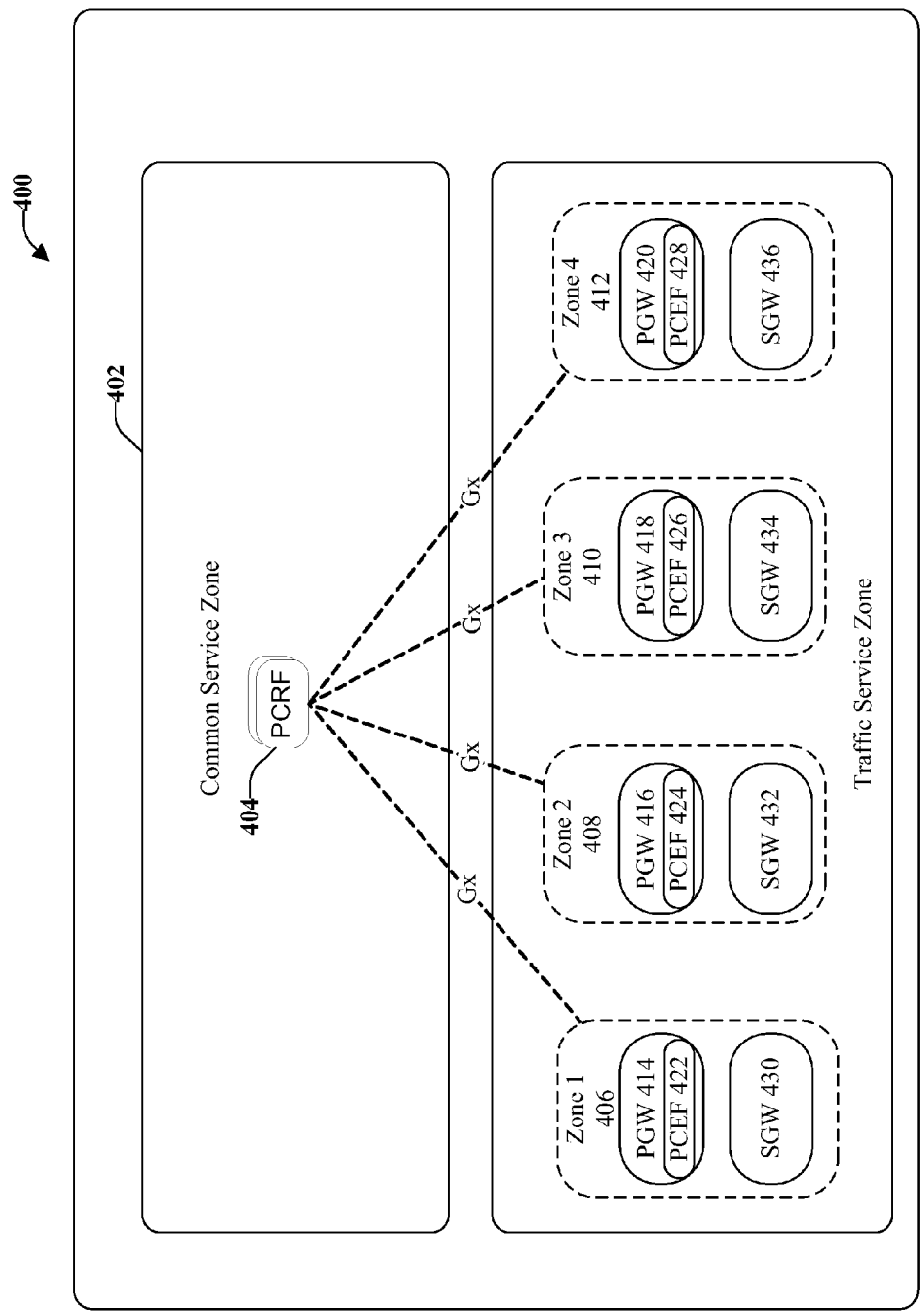
FIG. 4 illustrates a conventional network deployment architecture that does not incorporate the disclosed aspects.

To further describe the various aspects provided herein, FIG. 4 illustrates a conventional network deployment architecture 400 that does not incorporate the disclosed aspects. This architecture 400 can produce PCRF scaling problems. Included in the architecture 400 is a common service zone 402 that comprises one PCRF instance 404 in a national data center. The PCRF instance 404 is configured to support up to four traffic service zones, labeled as First Zone 406 (Zone 1), Second Zone 408 (Zone 2), Third Zone 410 (Zone 3), and Fourth Zone 412 (Zone 4). Thus, there is a one to four (1:4) relationship between the PCRF instance 404 and its service zones.

Each Zone comprises a PGW 414-420, which comprises a PCEF 422-428, and a Serving Gateway (SGW) 430-436. A policy session bind correlation and load balancing between the PCRF 404 and PCEF 416 are achieved though a predefined static configurations on each side. To support additional traffic service zones, additional PCRFs need to be added since the PCRF cannot support more than four service zones (per the 1:4 ratios). This scaling mechanism can present operational challenges as additional data centers are created within the communication network.

Figure 5:
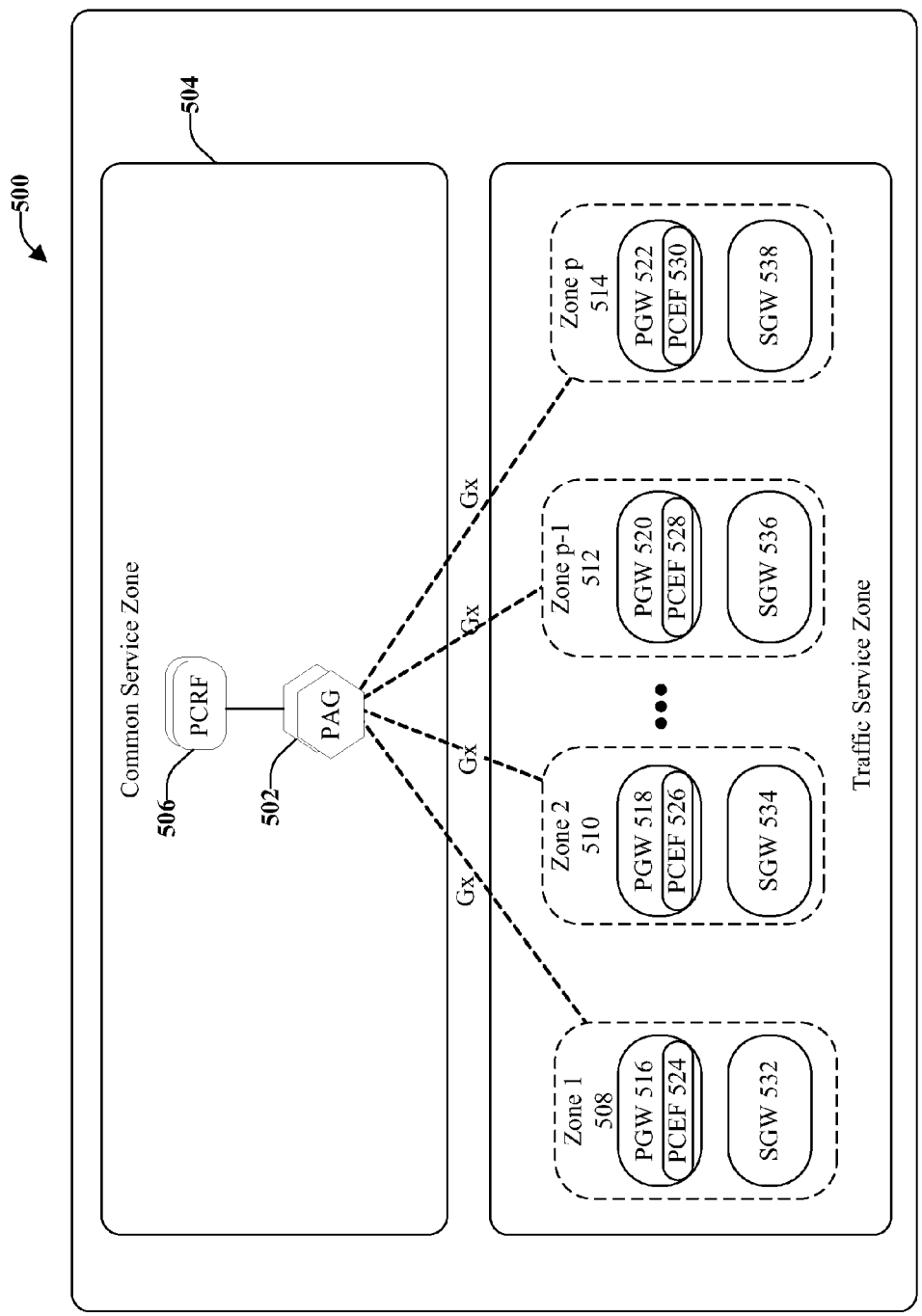
FIG. 5 illustrates a scalable deployment architecture, according to an aspect.

To overcome the scaling problem, FIG. 5 illustrates a scalable deployment architecture 500, according to an aspect. As illustrated, a PAG 502 (e.g., communication apparatus 110 of FIG. 1) is included in the deployment architecture 500. In accordance with some aspects, the PAG 502 can be based on RFC 3588 and relevant 3GPP standards for policy and charging control, which are incorporated herein by reference. Alternatively, the disclosed aspects do not depend on the 3GPP standard and other embodiments of the disclosed architecture apply to principles of the disclosed aspects in an architecture not fully compliant with 3GPP.

As illustrated, the PAG 502 can reside in a common service zone 504 and can interface with a PCRF 506. The PAG 502 can also interface with a plurality of service zones, labeled as a first zone 508 (Zone 1), a second zone 510 (Zone 2), and other zones up to zone p−1 512 and zone p 412, where p is an integer. Each zone comprises respective PGWs 516-522, PCEFs 524-530, and SGWs 532-538.

In accordance with some aspects, the PAG 502 performs functions similar to those of a Diameter Routing Relay and Proxy Agent for PCRF, as well as additional functions discussed herein. Thus, the PAG 502 can provide intelligent policy routing between PCEFs 524-530 and their managing PCRF 506 instance. Further, the PAG 502 allows P number of PCEFs to connect to their managing PCRF instance, which can provide large scale deployment flexibility. For example, zones can be added without the need to add additional PCRFs.

Figure 6:
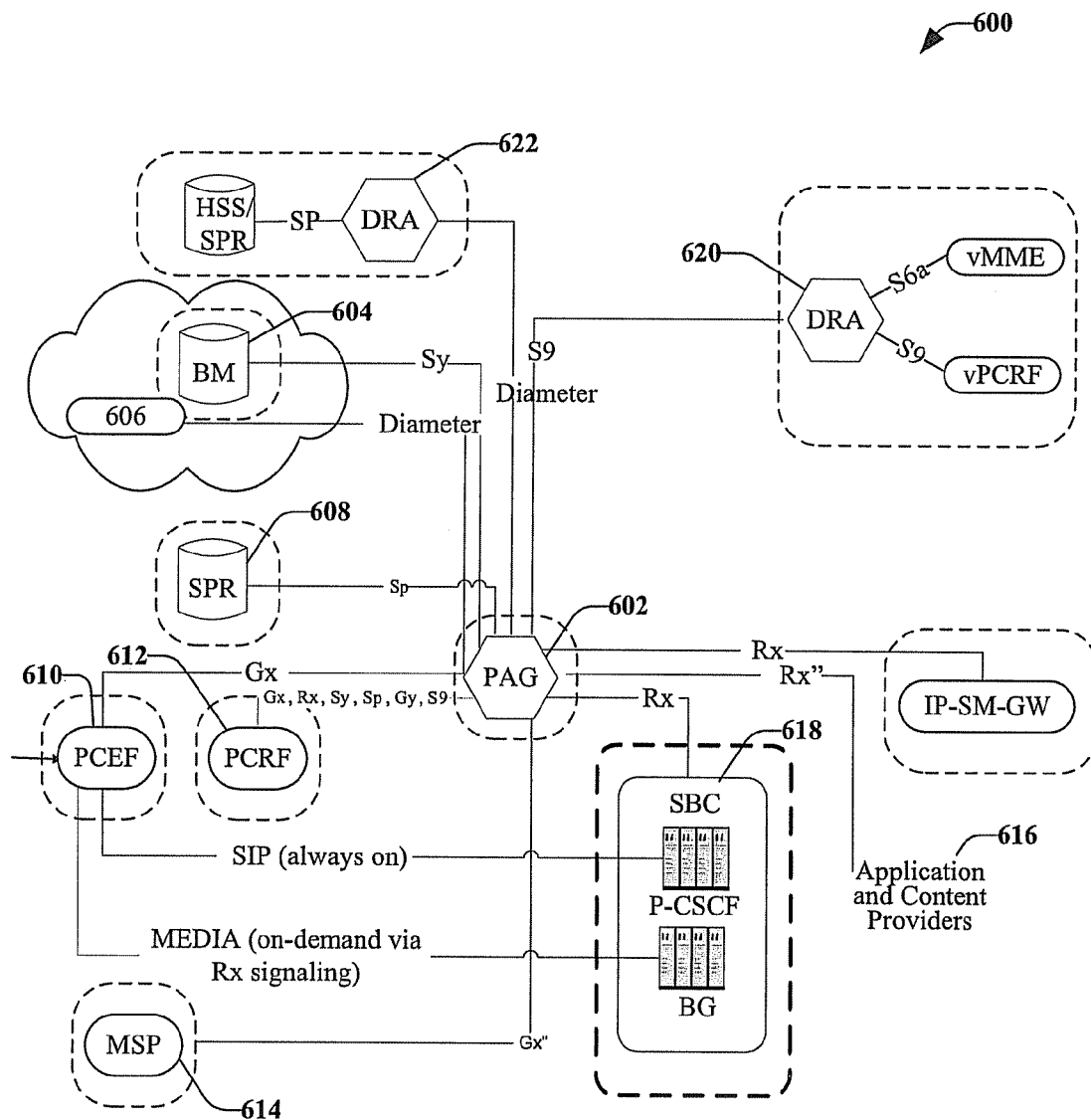
FIG. 6 illustrates an exemplary deployment architecture, according to an aspect.

FIG. 6 illustrates an exemplary deployment architecture 600, according to an aspect. Included in the deployment architecture 600 is a Policy Access Gateway (PAG) 602 (e.g., communications apparatus 110 of FIG. 1). The PAG 602 is configured to interface with a multitude of network entities. For example, the PAG 602 can interface with a Balance manager 604 (BM) and Provisioning Systems 606. The BM 604 can manage, for example, quota gigabytes per month, which can track the amount of usage for each user equipment. Such usage can be tracked for billing purposes (e.g., pay per view) or for other purposes (e.g., statistical information, usage information, and so forth). The PAG 602 can also interface with a SPR 608, a PCEF 610, and PCRF 612, wherein there can be a multitude of PCRFs included in the architecture 600.

Further, the PAG 602 can interface with a Managed Services Provider (MSP) 614 over a Gx interface. The PAG 602 can also interface with Application and Content Providers 616 over an Rx interface, for example. Additionally, the PAG can interface with one or more DRAs 620, 622 and a Session Boarder Controller (SBC 618), which controls the signaling and the media streams involved in setting up, conducting, and tearing down voice calls or other interactive media and can comprise an Application Function (AP).

The PAG 602 is configured to consolidate all policy related functions. The PAG 602 is also configured to manage the network related policies. Further, the PAG 602 can comprise the standard Diameter Routing Agent (DRA) functions as defined by 3GPP. In addition, the PAG 602 can also be configured to perform other functions, such as processing policies and retaining some state and session information.

The illustrated deployment architecture 600 can be based on an existing network topology and can further provide support for future LTE network deployment. Thus, the disclosed aspects can support IP Multimedia Subsystem (IMS)-based services such as Voice (links to the Session Border Controller (SBC) for both signaling and media) and messaging (IP-SM-GW). Further, by deploying the PAG 602, as disclosed herein, the various aspects can provide scalability to the policy functions in large LTE deployments, which will be able to support hundreds of millions of users. The DRA 620 can take the diameter function and route the function and perform other standard routing functions.

Figure 7:
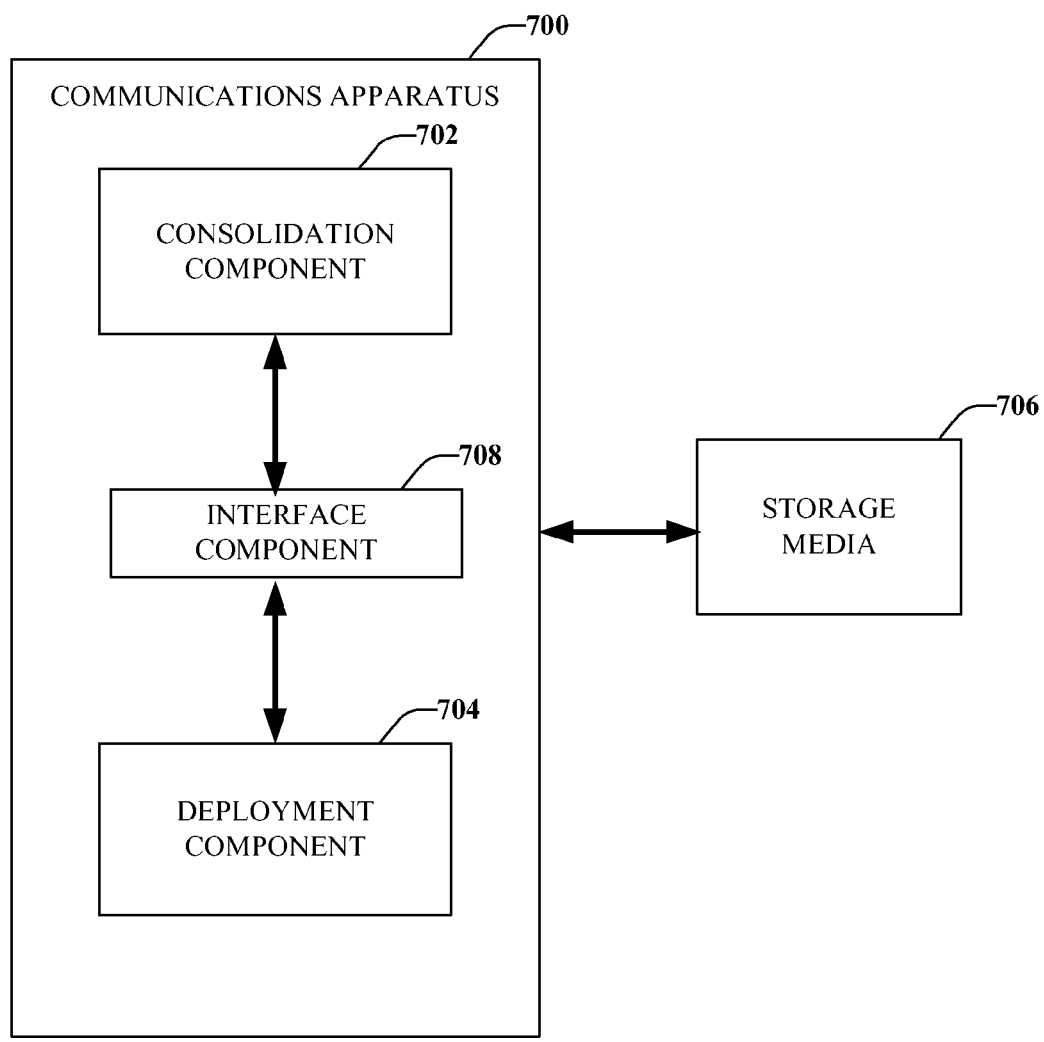
FIG. 7 illustrates an exemplary Policy Access Gateway (PAG), according to an aspect.

FIG. 7 illustrates an exemplary communications apparatus, which can be a Policy Access Gateway (PAG) 700, according to an aspect. The PAG 700 can comprise a consolidation component 702 that is configured to manage and consolidate network related policies. The network related policies can be received from different network entities, wherein at least one network entity performs a first function that is different from a second function performed by a second entity. Also included in the PAG 700 is a deployment component 704 that is configured to implement the network related policies on a multitude of service zones (e.g., five or more service zones).

In accordance with some aspects, the PAG 700 is associated with a storage media 706. Although shown as external to the PAG 700, according to some aspects, storage media 706 can be contained, at least partially, within the PAG 700. Storage media 706 can be configured to retain at least one state and at least one session information related to a service in at least one service zone of the multitude of service zones.

An interface component 708 can be included in the PAG 700, in accordance with some aspects. The interface component 708 can be configured to communicate with the multitude of service zones on behalf of an entity (or two or more entities). Additionally or alternatively, the interface component 708 can be configured to communicate with the entity (or the two or more entities) on behalf of the multitude of service zones.

Figure 8:
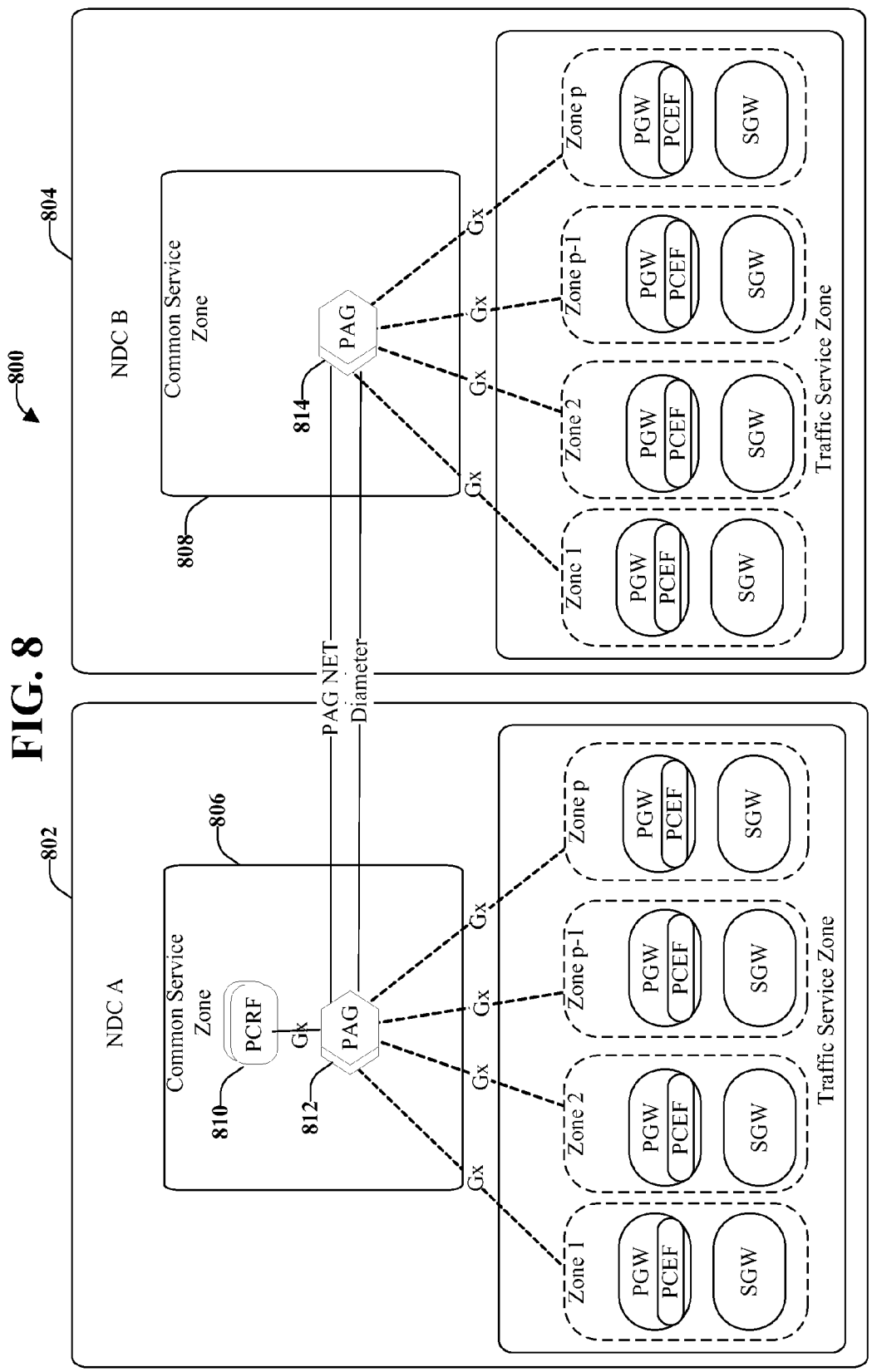
FIG. 8 illustrates a deployment architecture that comprises multiple geographical locations, according to an aspect.

FIG. 8 illustrates a deployment architecture 800 that comprises multiple geographical locations, according to an aspect. The deployment architecture 800 can comprise two or more National Data Centers (NDC), illustrated as NDC A 802 and NDC B 804. Each NDC comprises a common service zone 806, 808. However, only common service zone 806 comprises a PCRF 810. The PCRF 810 communicates with PAG 812 and PAG 814. Each PAG 812, 814 supports a multitude of Zones, Labeled Zone 1, Zone 2, through Zone p−1, and Zone p.

Thus, the disclosed aspects can provide PCRF scaling for PCEF, where PCRF is not located in the same NDC with the PCEFs. The PCRF can provide policy and charging control for PCEFs from P number of traffic service zones in different NDC PAG-networks, which is a globally routable, secured, and dedicate network for PAG signaling for routing policy traffic.

By way of example and not limitation, policy based routing supporting PCRF scaling and policy geographic distribution (flexible deployment architecture (FIGS. 5 and 8) can be configured to provide support for standard policy routing functions.

In another example, the disclosed aspects can provide dynamic policy based transaction state tracking and management. This can provide a policy based tracking mechanism in addition to simple standard routing. With this mechanism, the network can keep track of the sessions between any network nodes for all subscribers and for each user's current services and the network elements that provide the services. With this intelligence, dynamic and customized services becomes possible.

Figure 9:
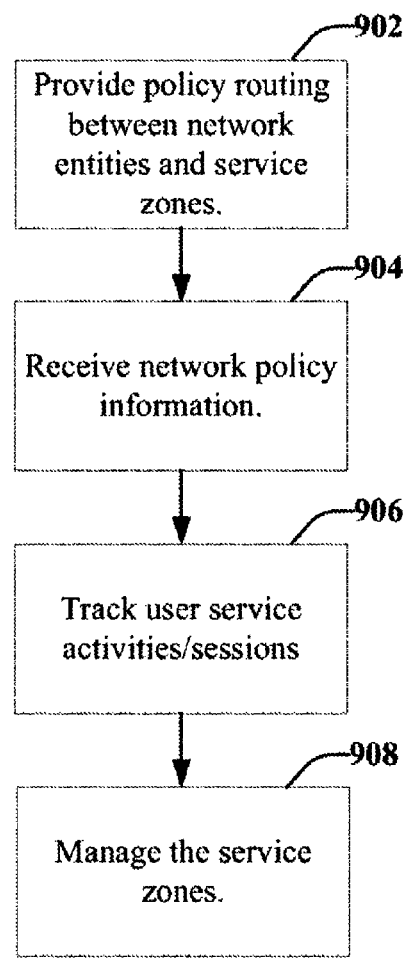
FIG. 9 illustrates a flow chart for providing a scalable policy deployment architecture, in accordance with an aspect.

FIG. 9 illustrates a flow chart for providing a scalable policy deployment architecture, in accordance with an aspect. At 902, routing between network entities and a plurality of service zones is provided. In accordance with some aspects, the routing between the network entities and five or more service zones is provided. Each of the network entities can support a different function. In accordance with some aspects, subsets of the network entities support different functions.

At 904, network policy information is received from the network entities. User service activities are tracked, at 906. The tracking of user service activities can comprise tracking a first activity for a first user service session and a second activity for a second user service session. In accordance with some aspects, the tracking comprises tracking a plurality of services provided to one user device. In another aspect, the tracking comprising tracking different network elements (or network entities) that facilitate the services. Further, different combinations of different network nodes that support the user service activities can be tracked.

The plurality of service zones are managed, at 908. The management of the plurality of service zones can be based on the network policy information. In accordance with some aspects, the management is performed on behalf of one or more of the network entities.

In accordance with some aspects, the method 900 can also include retaining at least one state and session information related to one or more services of one or more service zones of the plurality of service zones.

Exemplary Networked and Operating Environments

In one embodiment, a computer-readable storage medium comprises computer-executable code instructions stored therein, wherein in response to execution by at least one processor, the computer-executable code performs operations comprising tracking user service activities with respect to a wireless communication network and correlating the user service activities to different combinations of network nodes that support the user service activities. The user service activities can comprise a first activity for a first user equipment and a second activity for a second user equipment. In accordance with some aspects, the user service activities comprise a plurality of services provided to one user equipment. According to some aspects, the user service activities comprise different network elements that provide the services. The operations can also comprise providing routing between network entities and a plurality of service zones, receiving network policy information from the network entities with different functions, and managing the plurality of service zones based on the network policy information, wherein the managing is performed on behalf of the network entity.

Figure 10:
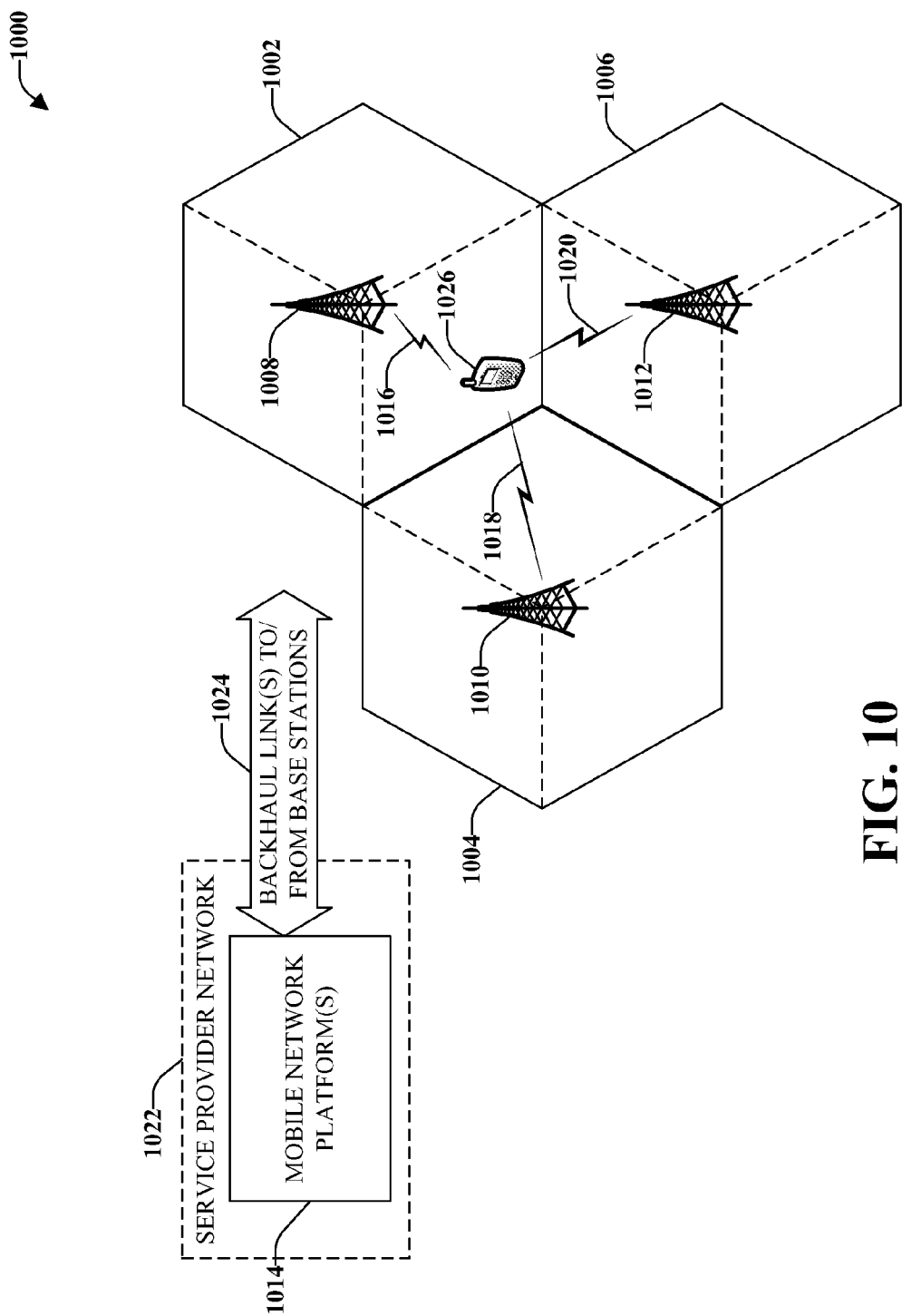
FIG. 10 is a schematic example wireless environment that can operate in accordance with aspects described herein.

By way of further description with respect to one or more non-limiting ways to provide scalable policy deployment, FIG. 10 is a schematic example wireless environment 1000 that can operate in accordance with aspects described herein. In particular, example wireless environment 1000 illustrates a set of wireless network macro cells. Three coverage macro cells 1002, 1004, and 1006 comprise the illustrative wireless environment; however, it should be appreciated that wireless cellular network deployments can encompass any number of macro cells, for example, 1004-1005 coverage macro cells. Coverage macro cells 1002, 1004, and 1006 are illustrated as hexagons; however, coverage cells can adopt other geometries generally dictated by a deployment configuration or floor plan, geographic areas to be covered, and so on. Each macro cell 1002, 1004, and 1006 is sectorized in a $2\pi/3$ configuration in which each macro cell includes three sectors, demarcated with dashed lines in FIG. 10. It should be appreciated that other sectorizations are possible, and aspects or features of the disclosed subject matter can be exploited regardless of type of sectorization. Macro cells 1002, 1004, and 1006 are served respectively through base stations or eNodeBs 1008, 1010, and 1012. Any two eNodeBs can be considered a eNodeB site pair (NBSP). It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 1014, and set of base stations (e.g., eNode B 1008, 1010, and 1012) that serve a set of macro cells; electronic circuitry or components associated with the base stations in the set of base stations; a set of respective wireless links (e.g., links 1016, 1018, and 1020) operated in accordance to a radio technology through the base stations, form a macro radio access network (RAN). It is further noted, that based on network features, the radio controller can be distributed among the set of base stations or associated radio equipment. In an aspect, for UMTS-based networks, wireless links 1016, 1018, and 1020 embody a Uu interface (UMTS Air Interface).

Mobile network platform(s) 1014 facilitates circuit switched (CS)-based (e.g., voice and data) and packet-switched (PS) (e.g., internet protocol (IP), frame relay, or asynchronous transfer mode (ATM)) traffic and signaling generation, as well as delivery and reception for networked telecommunication, in accordance with various radio technologies for disparate markets. Telecommunication is based at least in part on standardized protocols for communication determined by a radio technology utilized for communication. In addition telecommunication can exploit various frequency bands, or carriers, which include any EM frequency bands licensed by the service provider 1022 (e.g., personal communication services (PCS), advanced wireless services (AWS), general wireless communications service (GWCS), and so forth), and any unlicensed frequency bands currently available for telecommunication (e.g., the 2.4 GHz industrial, medical and scientific (IMS) band or one or more of the 5 GHz set of bands). In addition, mobile network platform(s) 1014 can control and manage base stations 1008, 1010, and 1012 and radio component(s) associated thereof, in disparate macro cells 1002, 1004, and 1006 by way of, for example, a wireless network management component (e.g., radio network controller(s), cellular gateway node(s), etc.) Moreover, wireless network platform(s) can integrate disparate networks (e.g., femto network(s), Wi-Fi network(s), femto cell network(s), broadband network(s), service network(s), enterprise network(s), and so on). In cellular wireless technologies (e.g., 3rd Generation Partnership Project (3GPP) Universal Mobile Telecommunication System (UMTS), Global System for Mobile Communication (GSM)), wireless network platform 1014 is embodied in a core network and a set of radio network controllers.

In addition, wireless backhaul link(s) 1024 can include wired link components like T1/E1 phone line; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, wireless backhaul link(s) 1024 embodies IuB interface.

It should be appreciated that while exemplary wireless environment 1000 is illustrated for macro cells and macro base stations, aspects, features and advantages of the disclosed subject matter can be implemented in microcells, picocells, femto cells, or the like, wherein base stations are embodied in home-based access points.

Figure 11:
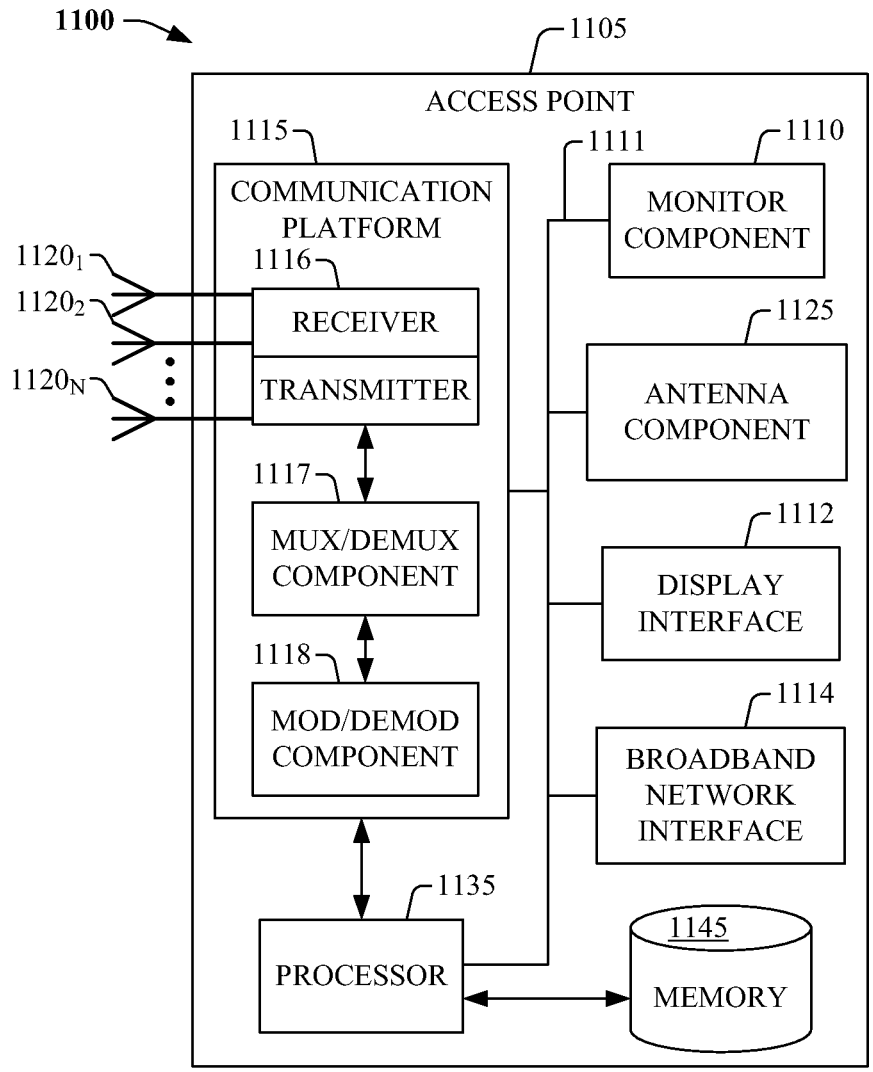
FIG. 11 illustrates a block diagram of an access point, in accordance with an embodiment.

To provide further context for various aspects of the disclosed subject matter, FIG. 11 illustrates a block diagram of an embodiment 1100 of an access point 1105, e.g., base station, wireless access point, femtocell access point, etc. that can enable and/or exploit features or aspects of the disclosed subject matter.

In embodiment 1100, access point 1105 can receive and transmit signal(s) from and to wireless devices, wireless ports, wireless routers, etc. through segments $1120_1$-$1120_N$ (N is a positive integer). Segments $1120_1$-$1120_N$ can be internal and/or external to access point 1105, and can be controlled by (1) monitor component 1110 and (2) antenna component 1125. Further, monitor component 1110 and antenna component 1125 can couple to communication platform 1115, which comprises electronic components and associated circuitry that provide for processing and manipulation of received signal(s) and other signal(s) to be transmitted.

In an aspect, communication platform 1115 includes a receiver/transmitter 1116 that can convert analog signals to digital signals upon reception of the analog signals, and convert digital signals to analog signals upon transmission. In addition, receiver/transmitter 1116 can divide a single data stream into multiple, parallel data streams, or perform the reciprocal operation. Coupled to receiver/transmitter 1116 is a multiplexer/demultiplexer 1117 that facilitates manipulation of signals in time and frequency space. Electronic component 1117 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1117 can scramble and spread information, e.g., codes, according to substantially any code known in the art, e.g., Hadamard-Walsh codes, Baker codes, Kasami codes, polyphase codes, etc. A modulator/demodulator 1118 is also a part of communication platform 1115, and can modulate information according to multiple modulation techniques, such as frequency modulation, amplitude modulation, e.g., M-ary quadrature amplitude modulation (QAM), with M a positive integer); phase-shift keying (PSK); etc.

Access point 1105 also includes a processor 1135 configured to confer, at least in part, functionality to substantially any electronic component in access point 1105. In particular, processor 1135 can facilitate configuration of access point 1105 via, e.g., monitor component 1110, antenna component 1125, and one or more component therein. Additionally, access point 1105 can include display interface 1112, which can display functions that control functionality of access point 1105, or reveal operation conditions thereof. In addition, display interface 1112 can include a screen to convey information to an end user. In an aspect, display interface 1112 can be an LCD (Liquid Crystal Display), a plasma panel, a monolithic thin-film based electrochromic display, and so on. Moreover, display interface 1112 can also include a component (e.g., speaker) that facilitates communication of aural indicia, which can also be employed in connection with messages that convey operational instructions to an end user. Display interface 1112 can also facilitate data entry e.g., through a linked keypad or via touch gestures, which can cause access point 1105 to receive external commands, e.g., restart operation.

Broadband network interface 1114 facilitates connection of access point 1105 to a service provider network (not shown) that can comprise one or more cellular technologies (e.g., 3GPP UMTS, GSM, etc.) via backhaul link(s) (not shown), which enable incoming and outgoing data flow. Broadband network interface 1114 can be internal or external to access point 1105, and can utilize display interface 1112 for end-user interaction and status information delivery.

Processor 1135 can be functionally connected to communication platform 1115 and can facilitate operations on data, e.g., symbols, bits, or chips, for multiplexing/demultiplexing, such as effecting direct and inverse fast Fourier transforms, selection of modulation rates, selection of data packet formats, inter-packet times, etc. Moreover, processor 1135 can be functionally connected, via data, system, or address bus 1111, to display interface 1112 and broadband network interface 1114, to confer, at least in part, functionality to each of such components.

In access point 1105, memory 1145 can retain location and/or coverage area, e.g., macro sector, identifier(s); access list(s) that authorize access to wireless coverage through access point 1105; sector intelligence that can include ranking of coverage areas in the wireless environment of access point 1105, radio link quality and strength associated therewith, or the like. Memory 1145 also can store data structures, code instructions and program modules, system or device information, code sequences for scrambling, spreading and pilot transmission, access point configuration, and so on. Processor 1135 can be coupled, e.g., via a memory bus, to memory 1145 in order to store and retrieve information used to operate and/or confer functionality to the components, platform, and interface that reside within access point 1105.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory 1145, non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
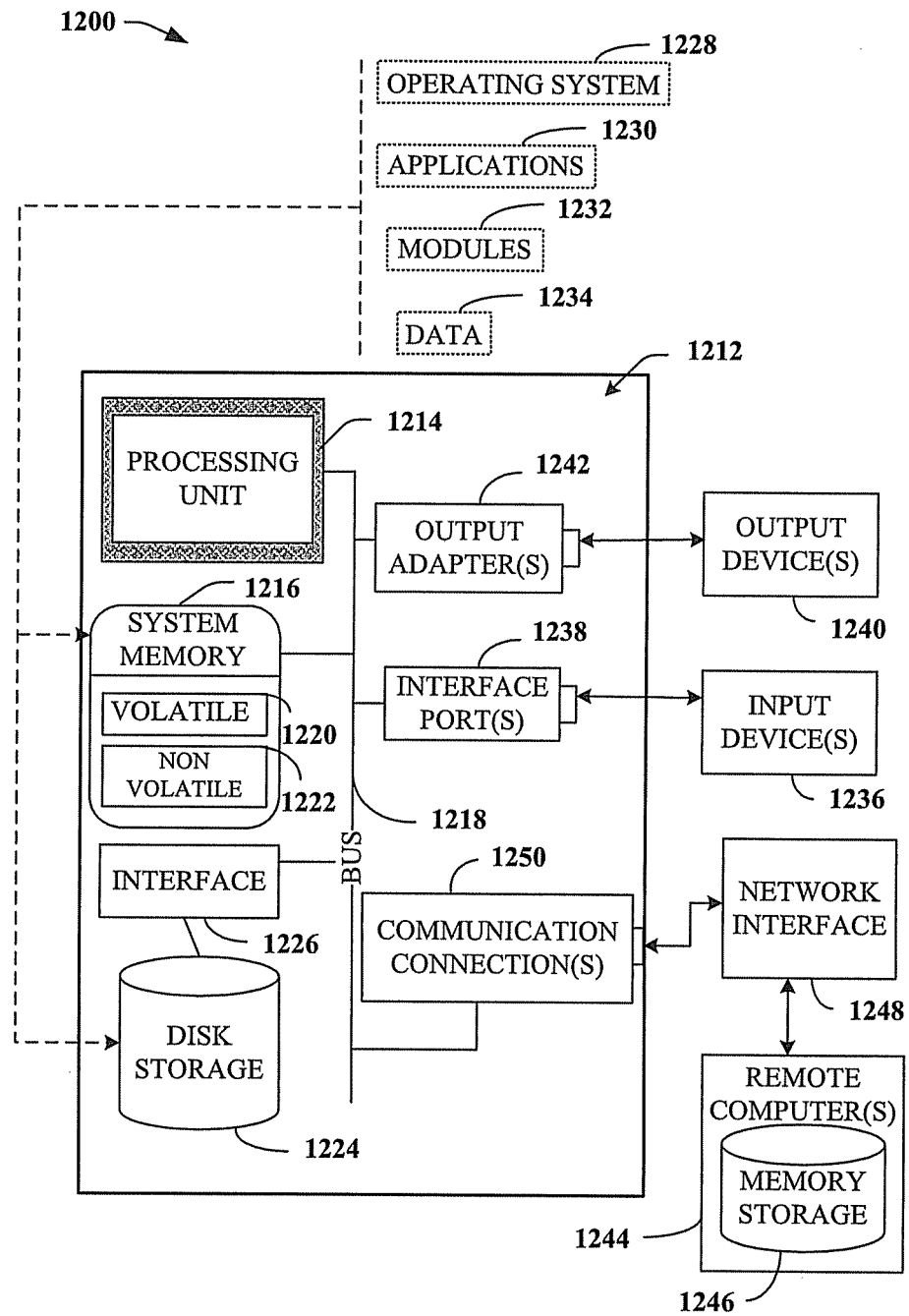
FIG. 12 illustrates a block diagram of a computing system, in accordance with an embodiment.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject application also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 12, a block diagram of a computing system 1200 operable to execute the disclosed systems and methods is illustrated, in accordance with an embodiment. Computer 1212 includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1216 includes volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

It is to be appreciated that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be appreciated that the disclosed subject matter can be implemented with various operating systems or combinations of operating systems.

A user can enter commands or information, e.g., via interface component 1226, into computer system 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1214 through system bus 1218 via interface port(s) 1238. Interface port(s) 1238 include, for example, a serial port, a parallel port, a game port, and a universal serial bus (USB). Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

It is to be noted that aspects, features, or advantages of the subject application described in the subject specification can be exploited in substantially any communication technology. For example, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects disclosed herein can be exploited in legacy telecommunication technologies; e.g., GSM. In addition, mobile as well non-mobile networks (e.g., Internet, data service network such as IPTV) can exploit aspect or features described herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification and annexed drawings, terms such as "store," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and dire Rambus RAM (DRRAM). Additionally, the disclosed memory components of systems or methods herein are intended to comprise, without being limited to comprising, these and any other suitable types of memory.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the subject application. It is, of course, not possible to describe every conceivable combination of components or methods for purposes of describing the subject application, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A method, comprising:
    facilitating, by a system comprising a processor, routing of network policy data between a policy decision engine and a network device associated with a traffic service zone serving mobile devices of the traffic service zone;
    receiving, by the system, the network policy data from the network device, wherein the network device performs a function;
    mapping, by the system, the network policy data to the traffic service zone; and
    managing, by the system, the traffic service zone based on the network policy data, wherein the managing is performed on behalf of the policy decision engine, and wherein the traffic service zone is applicable to additional mobile devices added to the mobile devices of the traffic service zone without an additional policy decision engine other than the policy decision engine.

2. The method of claim 1, further comprising:
    storing, by the system, state information related to a service associated with the traffic service zone.

3. The method of claim 1, wherein the facilitating comprises facilitating routing of other network policy data of another network device associated with another traffic service zone, between the policy decision engine and the other traffic service zone.

4. The method of claim 3, wherein the managing comprises managing the network device and the other network device, wherein the network device associated with the traffic service zone is determined to be located in a first data center storage device, and wherein the other network device associated with the other traffic service zone is determined to be located in a second data center storage device.

5. The method of claim 3, wherein the other network device performs a policy enforcement function.

6. The method of claim 1, further comprising:
tracking, by the system, a service activity based on an Internet protocol data stream that represents bits for the service activity.

7. The method of claim 6, wherein the tracking comprises tracking the service activity for a first service and tracking another service activity for a second service different from the first service.

8. The method of claim 6, wherein the tracking comprises tracking different network elements of the network device that facilitates the service activity.

9. The method of claim 1, further comprising:
communicating, by the system, with the network device on behalf of the policy decision engine.

10. An apparatus, comprising:
a processor; and
a memory that stores executable instructions that, when executed by the processor, facilitate performance of operations, comprising:
tracking network related policies, wherein the network related policies comprise rules received from network operator devices;
associating the network related policies with a related service zone;
consolidating at least a subset of the network related policies into a consolidated policy;
conveying the consolidated policy for deployment by a first network device and a second network device, of the set of network devices; and
facilitating enforcement of the network related policies by remotely facilitating management of the network related policies by the first network device and the second network device.

11. The apparatus of claim 10, wherein the operations further comprise:
configuring session information data related to a service associated with the related service zone.

12. The apparatus of claim 10, wherein the tracking comprises tracking at a network operator device level to match the consolidated policy to a user device.

13. The apparatus of claim 12, wherein the network related policies are matched to the network operator device level.

14. The apparatus of claim 10, wherein the tracking comprises tracking a first activity of the first network device and a second activity of the second network device.

15. The apparatus of claim 10, wherein the operations further comprise:
storing state information and session information related to a service associated with the related service zone.

16. A computer-readable storage device comprising executable instructions stored therein, wherein, in response to execution, a system comprising a processor performs operations, comprising:
tracking network policy data associated with network devices of a wireless communication network;
consolidating the network policy data into a set of network policy data;
conveying the set of network policy data for deployment by a policy decision engine; and
mapping the subset of network policy data to traffic service zones associated with the network devices.

17. The computer-readable storage device of claim 16, wherein the conveying comprises conveying the set of network policy data for implementation by the policy decision engine.

18. The computer-readable storage device of claim 16, wherein the network policy data comprises service data representing a service activity provided to the network devices.

19. The computer-readable storage device of claim 18, wherein different network elements of the network devices support the service activity.

20. The computer-readable storage device of claim 18, wherein the service activity comprises a voice call, an instant message, and an Internet browsing session.

* * * * *